(12) United States Patent
Kamkar et al.

(10) Patent No.: US 11,516,665 B2
(45) Date of Patent: Nov. 29, 2022

(54) SECURE AUTHORIZATION VIA A DYNAMIC INTERFACE ON A VISITOR DEVICE

(71) Applicant: OpenPath Security Inc., Culver City, CA (US)

(72) Inventors: Samy Kamkar, Los Angeles, CA (US); Alexander A. Kazerani, Santa Monica, CA (US)

(73) Assignee: OPENPATH SECURITY INC., Culver City, CA (US)

( * ) Notice: Subject to any disclaimer, the term of this patent is extended or adjusted under 35 U.S.C. 154(b) by 337 days.

(21) Appl. No.: 16/876,244

(22) Filed: May 18, 2020

(65) Prior Publication Data
US 2021/0360403 A1 Nov. 18, 2021

(51) Int. Cl.
*H04W 12/08* (2021.01)
*H04L 9/40* (2022.01)
*G06F 16/955* (2019.01)
*H04W 4/80* (2018.01)
*G06F 21/62* (2013.01)

(52) U.S. Cl.
CPC .......... *H04W 12/08* (2013.01); *G06F 16/955* (2019.01); *G06F 21/6218* (2013.01); *H04L 63/08* (2013.01); *H04L 63/10* (2013.01); *H04W 4/80* (2018.02)

(58) Field of Classification Search
None
See application file for complete search history.

(56) References Cited

U.S. PATENT DOCUMENTS

| 9,009,805 | B1 * | 4/2015 | Kirkby | G08B 13/19613 709/224 |
|---|---|---|---|---|
| 9,697,503 | B1 * | 7/2017 | Penilla | B60K 35/00 |
| 2017/0270490 | A1 * | 9/2017 | Penilla | G07C 5/006 |
| 2020/0059788 | A1 * | 2/2020 | Kamkar | G06F 9/445 |
| 2020/0064783 | A1 * | 2/2020 | Tran | G06Q 20/3674 |
| 2020/0064815 | A1 * | 2/2020 | Tran | G05B 19/4155 |
| 2020/0159323 | A1 * | 5/2020 | Gand | G06F 3/04842 |

* cited by examiner

*Primary Examiner* — Kaveh Abrishamkar

(57) ABSTRACT

A keyless access system for securely authorizing access to a resource via a dynamic interface that user equipment ("UE") may access using a changing access identifier without the UE installing or executing any specialized applications or code. The secure authorization of visitor access may include periodically modifying the access identifier, providing access activation data with a first access identifier to a UE in response to a triggering action, providing the dynamic interface to the UE in response to the access activation data automatically directing a browser of the UE to the first access identifier, receiving UE authorization data that is entered using a keypad or login screen of the dynamic interface, and providing access to the resource based on the first access identifier being associated with the resource, the UE authorization data authorizing access to the resource, and the access being provided before an expiration time.

20 Claims, 8 Drawing Sheets

SECURE AUTHORIZATION VIA A DYNAMIC INTERFACE ON A VISITOR DEVICE

BACKGROUND

Keyless access systems may be more convenient and secure than using physical keys. Physical keys can be lost and easily copied, and cannot be individualized for different users. For instance, different users may have the same physical key to access a door, whereas keyless access systems can uniquely identify which user accesses the door at what time based on unique access credentials that may be wireless transmitted from one or more devices associated with different users.

For visitors and/or other users that do not have previously configured keyless access or physical key access, a physical keypad may be provided adjacent to the particular door. The visitor may receive an access code that can be entered using the physical keypad in order to gain access.

Without the physical keypad or previously configured keyless access (e.g., a wireless keycard that is configured with valid access credentials or a specific application of the keyless access system that is installed and configured with valid access credentials on the visitor mobile device), the visitor may have no direct means of accessing the door or another secured resource. Instead, the visitor would have to involve another authorized user at the time of access.

DETAILED DESCRIPTION OF PREFERRED EMBODIMENTS

The following detailed description refers to the accompanying drawings. The same reference numbers in different drawings may identify the same or similar elements.

Disclosed is a keyless access system that may securely authorize visitor access to a secured resource via a dynamic interface that visitor user equipment ("UE") may access using a changing access identifier without the visitor UE installing or executing any specialized applications or code. The keyless access system may provide access activation data with the current access identifier for accessing a valid instance of the dynamic interface to the visitor UE upon detecting a triggering action performed when the visitor UE is in close proximity to the secured resource. The access activation data may cause the visitor UE to access the valid instance of the dynamic interface with little or no user interaction. The dynamic interface may provide a virtual keypad or a login screen on the visitor UE that remains valid for a period of time after detecting the triggering action, and the keyless access system may authorize access to the secured resource based on a valid access code, valid login credentials, or other authorization data that is input using the dynamic interface on the visitor UE. By requiring the triggering action to occur while the visitor UE is in close proximity to the secured resource, the keyless access system may prevent remote UEs from accessing the valid instance of the dynamic interface, which may prevent the remote UEs from exploiting the dynamic interface for malicious purposes or unauthorized access.

Accordingly, users, that do not have wireless access cards with valid access credentials (e.g., smartcards or proximity cards) or that do not have a specific application of the keyless access system with valid access credentials installed on their UEs, may still request and gain visitor access to secured resources under control of the keyless access system without involving another authorized user at the time of access and without interacting with physical keypads on system devices near the secured resources. Instead, the users may use their own UEs to securely authorize access to the secured resources without preconfiguring or preinstalling any specialized software on their UEs or customizing the UEs in any manner for the keyless access system. In particular, any UE, that can be used to perform the triggering action, may receive the access activation data that automatically directs the UE to a valid instance of the dynamic interface, and may authorize access to a secured resource by using any available wireless network and browser to submit a valid access code, valid login credentials, and/or other authorization data through the dynamic interface.

Figure 1:
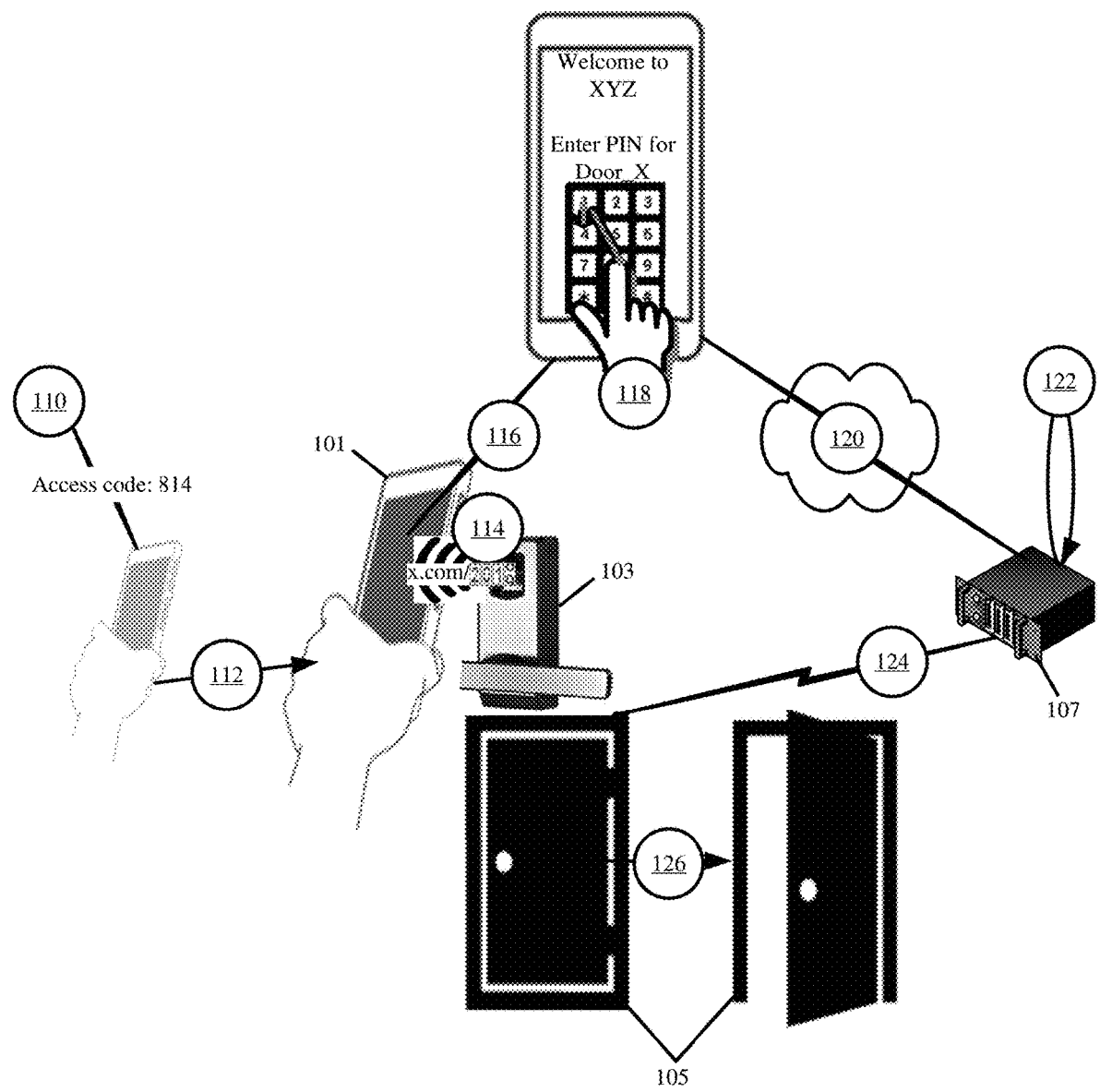
FIG. 1 illustrates an example of securely authorizing user access to a secured resource via a dynamic interface that is provided to visitor user equipment ("UE") upon detection of a triggering action in accordance with some embodiments presented herein.

FIG. 1 illustrates an example of securely authorizing user access to a secured resource via a dynamic interface that is provided to a visitor UE upon detection of a triggering action in accordance with some embodiments presented herein. As shown in FIG. 1, the secure authorization may involve visitor UE 101, resource access device 103, secured resource 105, and access control unit 107.

Visitor UE 101 may receive (at 110) a visitor access code from the keyless access system (e.g., access control unit 107) or an authorized user of the keyless access system. The visitor access code may be electronically transmitted to visitor UE 101 via an email, text message, and/or other data communication. In some embodiments, the visitor access code may be spoken to the user of visitor UE 101, written on a piece of paper, or otherwise conveyed to the user of visitor UE 101.

The visitor access code may include a numeric or alphanumeric value for granting visitor access to secured resource 105. The visitor access code may be associated with an expiration time, and may become invalid after the expiration time. The visitor access code may include other restrictions. For instance, the visitor access code may become invalid after a first use, may only be used to access secured resource 105 and no other secured resource of the keyless access system, may be valid when used with a specific signature of visitor UE 101 (e.g., a specific user agent, a specific Internet Protocol ("IP") address, etc.). Access control unit 107 may store the visitor access code and/or code usage restrictions, and may use the visitor access code to authorizing visitor access to secured resource 105.

As shown in FIG. 1, a user may perform (at 112) a triggering action by placing visitor UE 101 next to or against resource access device 103. Placing visitor UE 101 next to or against resource access device 103 may initiate a Near Field Communication ("NFC") tap-and-go-operation.

In response to detecting the triggering action and/or initiating the NFC tap-and-go-operation, resource access device 103 may provide (at 114) visitor UE 101 with access activation data that includes the current access identifier for accessing a valid instance of the dynamic interface, and that further includes instructions causing visitor UE 101 to automatically access the valid instance of the dynamic interface at the current access identifier via a browser or other standard application of visitor UE 101 that is unaffiliated with the keyless access system. In some embodiments, resource access device 103 may provide (at 114) visitor UE 101 with an NFC Data Exchange Format ("ndef") tag. The ndef tag may include a Uniform Resource Identifier ("URI") that specifies the current access identifier for the valid instance of the dynamic interface. Visitor UE 101 may automatically open a browser and submit a request to the URI per standardized ndef procedures.

Resource access device 103 may periodically change the access identifier (e.g., every 5 seconds) that is used to access the valid instance of the dynamic interface, and may provide (at 114) the access activation data with the current access identifier upon detecting the triggering action. In some embodiments, resource access device 103 may periodically change the access identifier using a cryptographically secure rolling code or other dynamic URI generator. Resource access device 103 may be synchronized with access control unit 107 so that the access identifiers that are generated and distributed by resource access device 103 correspond to the access identifiers for accessing the valid instance of the dynamic interface from access control unit 107.

Each access identifier, that is generated by resource access device 103 and/or access control unit 107 for authorizing access to secured resource 105, may include a fixed first portion that identifies secured resource 105 and/or a static domain name for accessing the dynamic interface of the keyless access system. Each access identifier may further include a changing second portion that identifies the current valid instance of the dynamic interface for authorizing access to secured resource 105. The changing second portion may be a non-sequential rolling code or other changing non-sequential alphanumeric value that may be part of the URI path, query string parameters, header values, and/or other data values.

In some embodiments, resource access device 103 may provide (at 114) the access activation data and/or access identifier using other data formats, wireless protocols, and/or other messaging. For instance, the access identifier may include a telephone number, a particular application name or identifier that can be used to access the valid instance of the dynamic interface, etc.

Visitor UE 101 may automatically access (at 116) the valid instance of the dynamic interface in response to receiving (at 114) the access activation data. As noted above, the access activation data may initiate procedures of visitor UE 101 for automatically directing a browser to the access identifier identified within the access activation data without user interaction. In some embodiments, the access activation data may create a notification (e.g., on-screen notification or vibration) on visitor UE 101. The user may acknowledge, select, or otherwise interact with the notification, and in response to the interaction with the notification, visitor UE 101 may automatically launch a browser and direct the browser to the access identifier from the access activation data. In some embodiments, the access activation data may create a notification on visitor UE 101, and the user may turn on or unlock visitor UE 101 to permit the procedures initiated by the access activation data to execute, wherein the procedures may include one or more of opening a browser or web application and directing the browser or web application to the valid instance of the dynamic interface by submitting a request to the URI or access identified from the access activation data.

In some embodiments, visitor UE 101 may access (at 116) the valid instance of the dynamic interface so long as the access (at 116) occurs within a short period of time of receiving (at 114) the access activation data from resource access device 103. For instance, the access identifier for the valid instance of the dynamic interface may be valid for 5 seconds after transmission by resource access device 103. If visitor UE 101 does not access the dynamic interface within the 5 second interval, the dynamic interface may not be accessible using that access identifier, or may be accessible but cannot be used to authorize access to secured resource 105. If visitor UE 101 accesses the dynamic interface within the 5 second interval, a second expiration timer may provide a second time interval during which that instance of the dynamic interface may be used to authorize access to secured resource 105. For instance, access control unit 107 may accept and process authorization requests from visitor UE 101 if the requests occur within one minute of visitor UE 101 accessing the dynamic interface, and may discard requests from visitor UE 101 if the requests occur after one minute of visitor UE 101 accessing the dynamic interface.

The dynamic interface may be used to request access to secured resource 105 via entry of a valid visitor code. In some embodiments, the dynamic interface may present a virtual keypad on visitor UE 101 with which the user may enter (at 118) the received (at 110) visitor access code. In some embodiments, the dynamic interface may present a login screen that can be used instead of a visitor access code. Using the login screen, the user may enter (at 118) login credentials or perform a single sign-on ("SSO") procedure through one or more authentication or authorization systems supported by the keyless access system. For instance, access control unit 107 may use the login credentials to verify the identity of the user, and may determine if the identified user is authorized to access secured resource 105. The SSO procedure allows a third-party system or service other than the keyless access system to verify the identity of the user, and access control unit 107 may determine if the user identified by the third-party system or service is authorized to access secured resource 105.

Visitor UE 101 may transmit (at 120) the visitor access code, login credentials, SSO credentials, and/or other authorization data to access control unit 107 over one or more wireless networks. The data may be transmitted (at 120) using one or more HyperText Transfer Protocol ("HTTP") messages or messages of other protocols.

Access control unit 107 may authorize (at 122) visitor UE 101 access to secured resource 105 based on the data transmitted (at 120) by visitor UE 101 and/or the access identifier of the dynamic interface. In some embodiments, access control unit 107 may authorize (at 122) access by determining that access is requested for secured resource 105 based on the access identifier (e.g., the fixed first portion or the changing second portion of the URI) used to access the dynamic interface, determining that the dynamic interface is valid or was valid when accessed by visitor UE 101 (e.g., the authorization occurs within an expiration time of providing the dynamic interface to visitor UE 101), and comparing the transmitted visitor access code or login credentials against a list of valid visitor access codes or authorized users. Authorizing (at 122) may further include validating access according to any restrictions that are defined for the valid visitor code or authorized user. For instance, visitor UE 101 may provide a valid visitor code using a valid instance of the dynamic interface, but access control unit 107 may deny access in response to determining that the valid visitor code is being used by visitor UE 101 and visitor UE 101 is not within a list of authorized UEs that may use that valid visitor code to access secured resource 105.

In response to unsuccessfully authorizing (at 122) visitor UE 101 access to secured resource 105, access control unit 107 may restrict or prevent access to secured resource 105. Access control unit 107 may also return a failed authorization message to visitor UE 101 via the dynamic interface.

In response to successfully authorizing (at 122) visitor UE 101 access to secured resource 105, access control unit 107 may issue (at 124) a signal and/or command to secured resource 105 to grant access to visitor UE 101. Specifically, the issued (at 124) signal and/or command may cause secured resource 105 to change state (e.g., change from a locked to an unlocked state). In some embodiments, access control unit 107 may have a secure wired or wireless connection to secured resource 105 in order to control operation of secured resource 105. In some embodiments, access control unit 107 may indirectly control secured resource 105 via resource access device 103 by issuing (at 124) the signals or commands to resource access device 103, and having resource access device 103 control operation of secured resource 105.

As shown in FIG. 1, granting access may include opening, unlocking, or otherwise providing access to secured resource 105. Examples of other secured resources that can be controlled by the keyless access control system of some embodiments are provided below with reference to FIG. 6.

Figure 2:
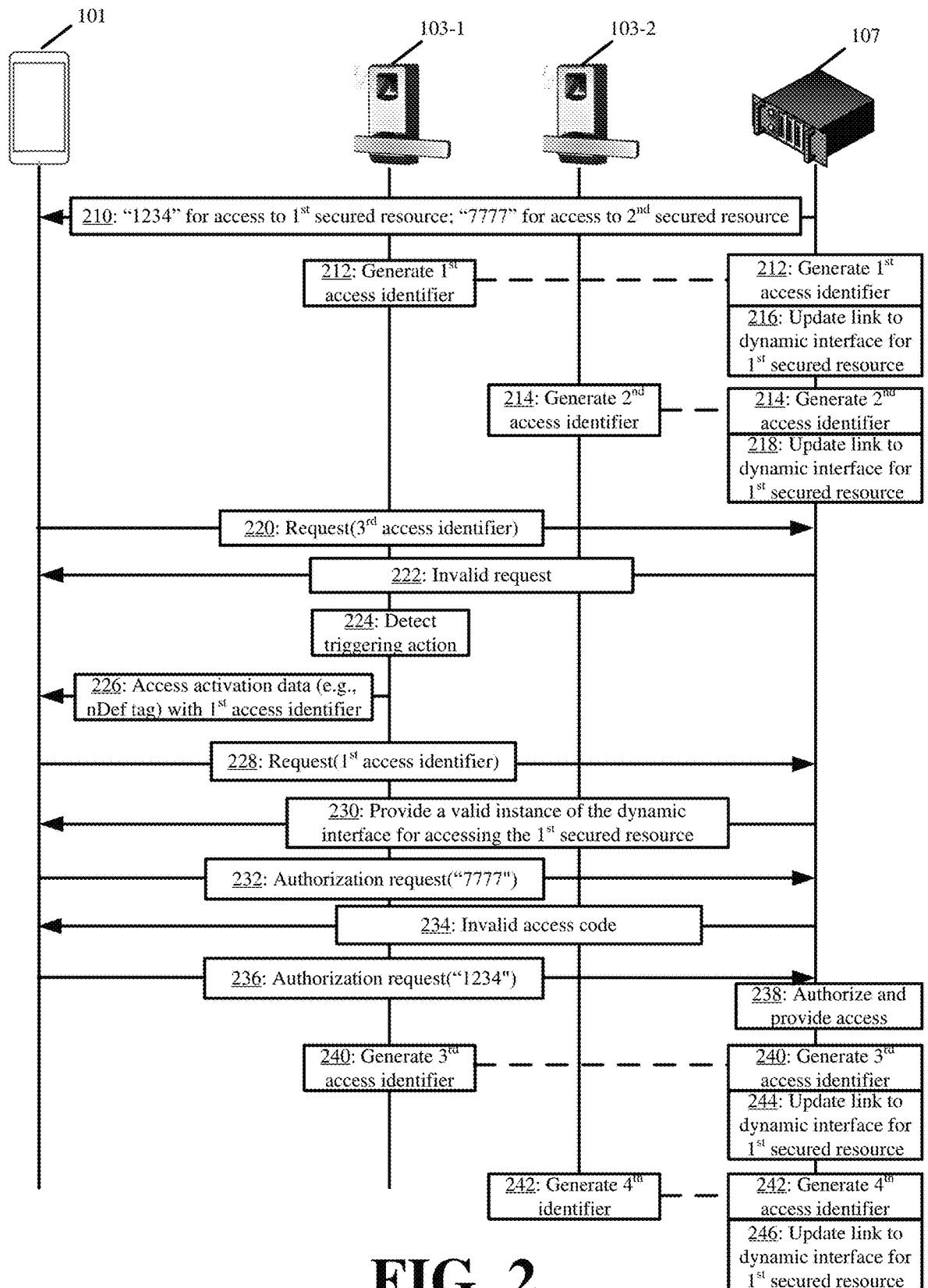
FIG. 2 illustrates an example for implementing the secure authorization by dynamically changing the access identifier and coordinating access to the valid instance of the dynamic interface based on the changed access identifiers in accordance with some embodiments presented herein.

FIG. 2 illustrates an example for implementing the secure authorization by dynamically changing the access identifier and coordinating access to the valid instance of the dynamic interface based on the changed access identifiers in accordance with some embodiments presented herein. As shown in FIG. 2, the keyless access system may include first resource access device 103-1, second resource access device 103-2, and access control unit 107. First resource access device 103-1 and second resource access device 103-2 may be collectively referred to as resource access devices 103 or individually referred to as resource access device 103. Each resource access device 103 may be at a different physical location, and may be used to facilitate access to a different secured resource that is under control of the keyless access system.

At a first time, access control unit 107 may provide (at 210) or configure different visitor access codes that visitor UE 101 may use to authorize access to the first secured resource and the second secured resource. At a later second time, first resource access device 103-1 and access control unit 107 may generate (at 212) a synchronized first access identifier for accessing a valid instance of the dynamic interface that can be used to request access to the first secured resource that is associated with first resource access device 103-1. At a third time after or contemporaneous with the second time, second resource access device 103-2 and access control unit 107 may generate (at 214) a synchronized second access identifier for accessing a valid instance of the dynamic interface that can be used to request access to the second secured resource that is associated with second resource access device 103-2.

In some embodiments, the first and second access identifiers may include different URIs, telephone numbers, query string parameters, IP address and port combinations, and/or other value(s) that can be used for a first period of time to access the valid instance of the dynamic interface for authorizing visitor access to the secured resources. For instance, the first access identifier may include first URI "www.example.com/firstresource/43234", and the second access identifier may include second URI "www.example.com/secondresource/678asd". In some embodiments, the first access identifier may be shortened to "www.example.com/43234", and the second access identifier may be shortened to "www.example.com/678asd". In some such embodiments, the dynamic path elements "—/43234" and "—/678asd" may be encoded to identify or may be associated with the secured resources that are associated with each resource access device 103 (e.g., "—/43234" may be decoded to identify the valid instance of the dynamic interface for requesting access to the first secured resource).

In some embodiments, each resource access device 103 may establish and maintain a secure network connection to access control unit 107. One of resource access device 103 and access control unit 107 may create the access identifier, and may notify the other device of the created access identifier.

In some other embodiments, each resource access device 103 and access control unit 107 may be configured with a rolling code generator. The rolling code generator can be a random number generator, a pseudo-random number generator, or a deterministic algorithm for generating a non-sequential set of values.

In embodiments based on a random or pseudo-random number generator, the number generator of each resource access device 103 may be seeded with a different value. Based on the seed value and the current time, the number generator generates different rolling codes that form a dynamic part of the access identifiers (e.g., "~/43234" or "~/678asd"). Some embodiments use a secure algorithm, such as CSPRNG (cryptographically secure pseudo-random number generator), for the generation of the rolling codes. The secure algorithm produces a deterministic output based off of a number of initial inputs, primarily a seed (e.g., secret) and beginning counter value (e.g., a number that changes based off of a known state, such as time or uses). In some such embodiments, access control unit 107 may be configured with the same seed value as each resource access device 103. Access control unit 107 may use the seed values to synchronously generate the same rolling code and/or access identifier at the same time as each resource access device 103. In this manner, the generation (at 212 and 214) of access identifiers at each resource access device 103 and access control unit 107 may be synchronized without the devices having to exchange access identifier data with one another.

As a result of generating (at 212) the first access identifier, access control unit 107 may update (at 216) an internal request mapping table so that the first access identifier links to and can be used by visitor UE 101 to access the valid instance of the dynamic interface for requesting access to the first secured resource. Similarly, as a result of generating (at 214) the second access identifier, access control unit 107 may update (at 218) the internal request mapping table so that the second access identifier links to and can be used by visitor UE 101 to access the valid instance of the dynamic interface for requesting access to the second secured resource.

Visitor UE 101 may issue (at 220) a request for an instance of the dynamic interface using a third access identifier. Access control unit 107 may receive (at 220) the request since the fixed first portion of the third access identifier may include a domain name that resolves to and/or routes to access control unit 107. Access control unit 107 may inspect the third access identifier of the request, may determine that the third access identifier does not match to the first access identifier or the second access identifier for accessing valid instances of the dynamic interface, and may determine that the request is for an invalid or obsolete dynamic interface. For requests directed to previously generated or invalid access identifiers, access control unit 107 may provide (at 222) a message that indicates the access identifier used to access the dynamic interface is outdated and/or invalid, and that the UE may obtain the current access identifier for accessing a valid instance of the dynamic interface by performing a specified triggering action (e.g., an NFC tap-and-go-operation) with resource access devices 103 that is nearest the secured resource where access is desired.

First resource access device 103-1 may detect (at 224) visitor UE 101 performing the triggering action. In response to detecting (at 224) the triggering action, first resource access device 103-1 may provide (at 226) visitor UE 101 with access activation data that include the first access identifier. In some embodiments, first resource access device 103-1 may provide (at 226) the first access identifier as part of an ndef tag, and the first access identifier may correspond to a URI, a URI path, query string parameters, header values, a telephone number, an IP address, IP address and port combination, and/or other data for the dynamic interface that can be used, during a current time interval, to request access to a first secured resource associated with first resource access device 103-1.

Visitor UE 101 may issue (at 228) a request for the dynamic interface using the first access identifier in response to receiving (at 226) the access activation data. Here again, the access activation data may cause visitor UE 101 to automatically issue (at 228) the request without a user opening and directing a browser or web application to the first access identifier.

Access control unit 107 may inspect the first access identifier of the request, and may determine that the first access identifier, and, specifically, the changing second portion of the first access identifier, is associated with a valid instance of the dynamic interface for requesting access to the first secured resource. Accordingly, access control unit 107 may provide (at 230) the valid instance of the dynamic interface for requesting access to the first secured resource to visitor UE 101. The provided (at 230) dynamic interface may include a virtual keypad with which a user may enter an access code, or may include a login screen with which the user may enter login credentials or SSO credentials.

The user may enter the second access code into the dynamic interface, and visitor UE 101 may transmit (at 232) an authorization request that includes the second access code to access control unit 107. Access control unit 107 may determine that the authorization request is directed to the first secured resource based on the first access identifier that was used to access the dynamic interface, and may determine that the second access code is not a valid access code for accessing the first secured resource (e.g., the second access code is a valid access code for accessing the second secured resource associated with second resource access device 130-2). Accordingly, access control unit 107 may return (at 234) an invalid access code error to visitor UE 101 via the dynamic interface.

The user may then enter the first access code into the dynamic interface that is presented on visitor UE 101, and visitor UE 101 may issue (at 236) an authorization request with the first access code to access control unit 107 before an expiration timer associated with the dynamic interface expires. Access control unit 107 may start the expiration timer upon providing (at 230) the valid instance of the dynamic interface to visitor UE 101.

Access control unit 107 may determine that the authorization request is directed to the first secured resource based on the first access identifier that was used to access the dynamic interface, and may determine that the first access code is a valid access code for accessing the first secured resource. Access control unit 107 may also verify that visitor UE 101 is permitted to use the first access code in order to access the first secured resource and that first access code remains valid for use. For instance, access control unit 107 may determine the device signature of visitor UE 101 from one or more data packets sent by visitor UE 101 to access control unit 107, may use various header fields to define the device signature, and may determine that the device signature is within a list of approved device signatures that may use the first access code in order to access the first secured resource. Accordingly, access control unit 107 may grant (at 238) access to the first secured resource by issuing a signal or command to the first secured resource or resource access device 103-1.

The rolling code generators on each resource access device 103 and access control unit may subsequently invalidate the first and second access identifiers by generating (at 240 and 242) different third and fourth access identifiers. In particular, first resource access device 103-1 and access control unit 107 may simultaneously or contemporaneously generate (at 240) the third access identifier, and access control unit 107 may update (at 244) the internal request mapping table so that the third access identifier, instead of the first access identifier, links to and can be used by visitor UE 101 to access the valid instance of the dynamic interface for requesting access to the first secured resource. Similarly, second resource access device 103-2 and access control unit 107 may simultaneously or contemporaneously generate (at 242) the fourth access identifier, and access control unit 107 may update (at 246) the internal request mapping table so that the fourth access identifier, instead of the second access identifier, links to and can be used by visitor UE 101 to access the valid instance of the dynamic interface for requesting access to the second secured resource.

Figure 3:
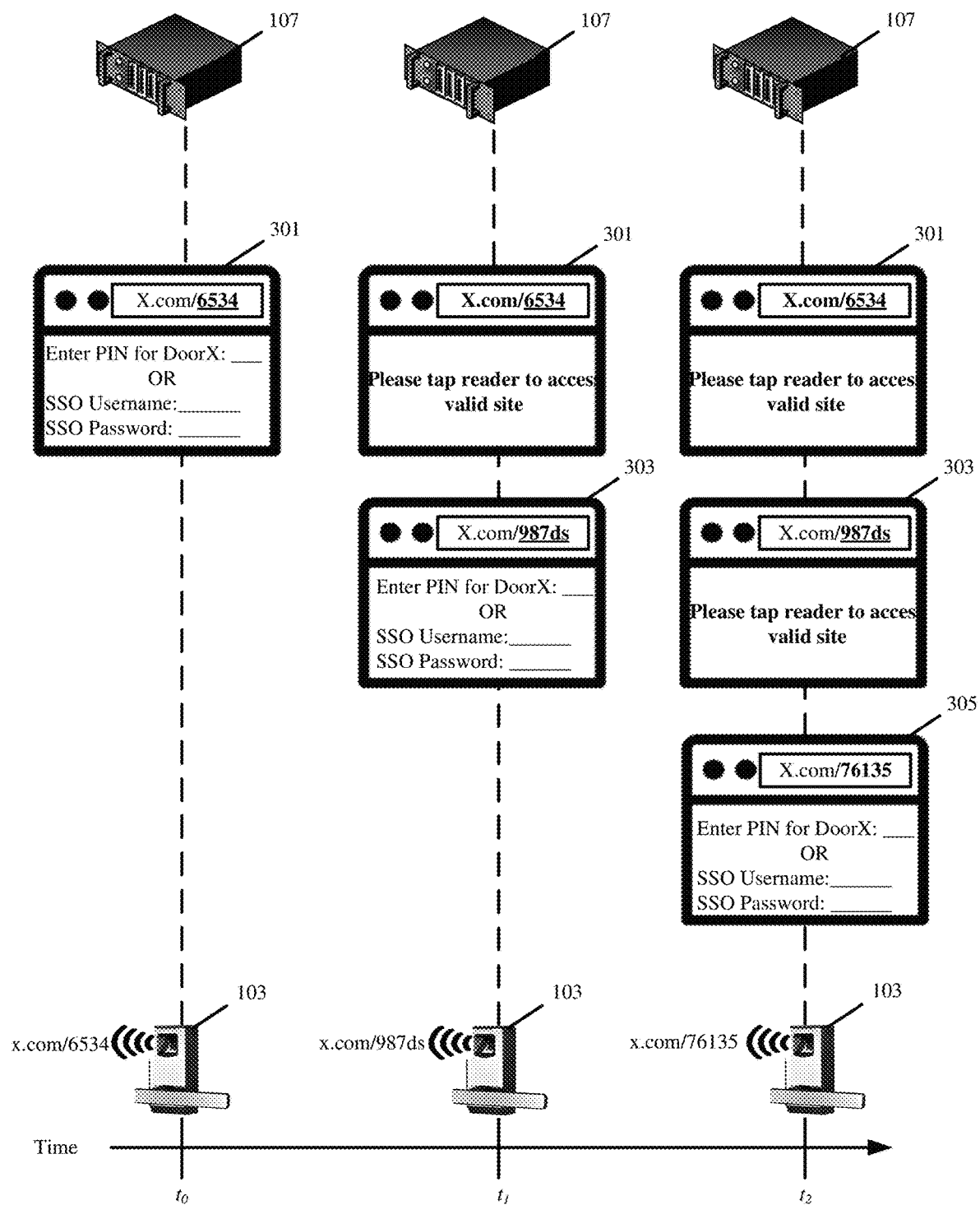
FIG. 3 illustrates an example of dynamically changing the access identifier for a valid instance of the dynamic interface that can be used by a visitor UE to access a particular secured resource in accordance with some embodiments presented herein.

FIG. 3 illustrates an example of dynamically changing the access identifier for a valid instance of the dynamic interface that can be used by visitor UE 101 to access a particular secured resource in accordance with some embodiments presented herein. In particular, FIG. 3 illustrates resource access device 103 and access control unit 107 performing the synchronized updating of the access identifier.

During a first time (e.g., time "t0"), resource access device 103 may generate and disseminate a first access identifier (e.g., access identifier "x.com/6534") upon detecting a triggering action, and access control unit 107 may generate and link the first access identifier to first valid instance of the dynamic interface 301 for accessing the secured resource that is associated with resource access device 103. In other words, UE requests that are directed to the first access identifier during the first time may access first valid instance of the dynamic interface 301, and may be used to request access to the secured resource via a valid access code or login credentials.

During a second time (e.g., time "$t_1$"), resource access device 103 may generate and disseminate a second access identifier (e.g., access identifier "x.com/987ds"), instead of the first access identifier, upon detecting the triggering action. Also, during the second time, access control unit 107 may generate and link the second access identifier to second valid instance of the dynamic interface 303 for accessing the secured resource that is associated with resource access device 103, and may invalidate, disable, or deactivate dynamic interface 301 that is accessed using the first access identifier.

For instance, as shown in FIG. 2, a request directed to the first access identifier (e.g., a first URI) during the first time may access first valid instance of the dynamic interface 301 with which the user may enter an access code or login credentials to gain access to the secured resource associated with resource access device 103. The same request directed to the first access identifier during the second time may result in dynamic interface 303 with an error message and/or an instruction to perform the triggering action with resource access device 103 in order to verify proximity of visitor UE 101 to a particular secured resource and to obtain the current access identifier (e.g., the second access identifier during the second time) for accessing a valid instance of the dynamic instance.

In some embodiments, the access identifiers are associated with an expiration parameter. If visitor UE 101 issues a request to a valid access identifier before the expiration of that access identifier, then visitor UE 101 may access the valid instance of the dynamic interface, and may request secured resource access by entering access codes or login credentials via that valid instance of the dynamic interface for a period of time after the expiration of that access identifier so long as the dynamic interface remains open. For instance, the valid access identifiers may change every five seconds, and visitor UE 101 may request a valid instance of the dynamic interface using a valid access identifier one second before that access identifier is invalidated and/or changed. Access control unit 107 may provide the valid instance of the dynamic interface to visitor UE 101 since the request was issued and/or arrived before expiration and/or changing of the access identifier. Moreover, access control unit 107 may provide visitor UE 101 an additional minute with which to enter a valid access code or login credentials via the dynamic interface. In some embodiments, access control unit 107 may establish a session with visitor UE 101 as part of providing the valid instance of the dynamic interface, and may start a timer to track the session length.

If visitor UE 101 provides a valid access code or login credentials more than one minute after access control unit 107 provides the dynamic interface (e.g., after the timer expires or surpasses one minute), access control unit 107 may disregard the access request, and may require visitor UE 101 to obtain a new valid access identifier by performing the triggering action with resource access device 103 anew.

During a third time (e.g., time "$t_2$"), resource access device 103 may generate and disseminate a third access identifier, instead of the first access identifier or the second access identifier, upon detecting the triggering action. Also, during the second time, access control unit 107 may generate and link the third access identifier to third valid instance of the dynamic interface 305 for accessing the secured resource that is associated with resource access device 103, and may invalidate, disable, or deactivate dynamic interfaces 301 and 303 that are accessed using other previously generated identifiers (e.g., the first access identifier or the second access identifier). As noted above, access control unit 107 may, however, keep alive sessions with UEs that access valid instances of the dynamic interface using either the first access identifier or the second access identifier while each respective identifier was valid for some time (e.g., one minute) after those identifiers become invalid in order to allow those UEs additional time to use the dynamic interface and submit access requests.

NFC and the touch-and-go-operation may be a preferred triggering action because it requires close proximity between visitor UE 101 and resource access device 103. The close proximity may ensure that the secure authorization is performed for visitor UE 101 that is present at resource access device 103 and/or the associated secured resource for which access is authorized, and therefore prevents remote UEs from using a brute force or other scheme to determine valid access code remotely and/or to gain unauthorized remote access. The dynamic interface and the changing access identifier contribute to the enhanced security by preventing remote UEs from accessing the valid instance of the dynamic interface without being physically present before resource access device 103 to perform the triggering action. Moreover, the dynamic interface and the changing access identifier may prevent visitor UE 101 from performing the triggering action once and subsequently accessing the dynamic interface at a later time to authorize access when visitor UE 101 is no longer next to resource access device 103 or the secured resource.

In some embodiments, different triggering actions may be used to initiate the secure authorization and conveyance of the access activation data with the changing access identifier. The different triggering actions may be performed in addition to or instead of the NFC touch-and-go-operation, and/or may be provided for UEs that do support NFC or that support other radio network technologies. In some embodiments, a changing Quick Response ("QR") code, barcode, or other visual identifier that can be scanned and decoded by visitor UE 101 may be used to provide the access activation data and automatically cause visitor UE 101 to direct a browser to an access identifier that is encoded within the visual identifier and that links to the valid instance of the dynamic interface. In some embodiments, contactless triggering actions for providing access activation data may be implemented using Bluetooth, WiFi, Ultra-wideband ("UWB"), and/or other radio network technologies.

Figure 4:
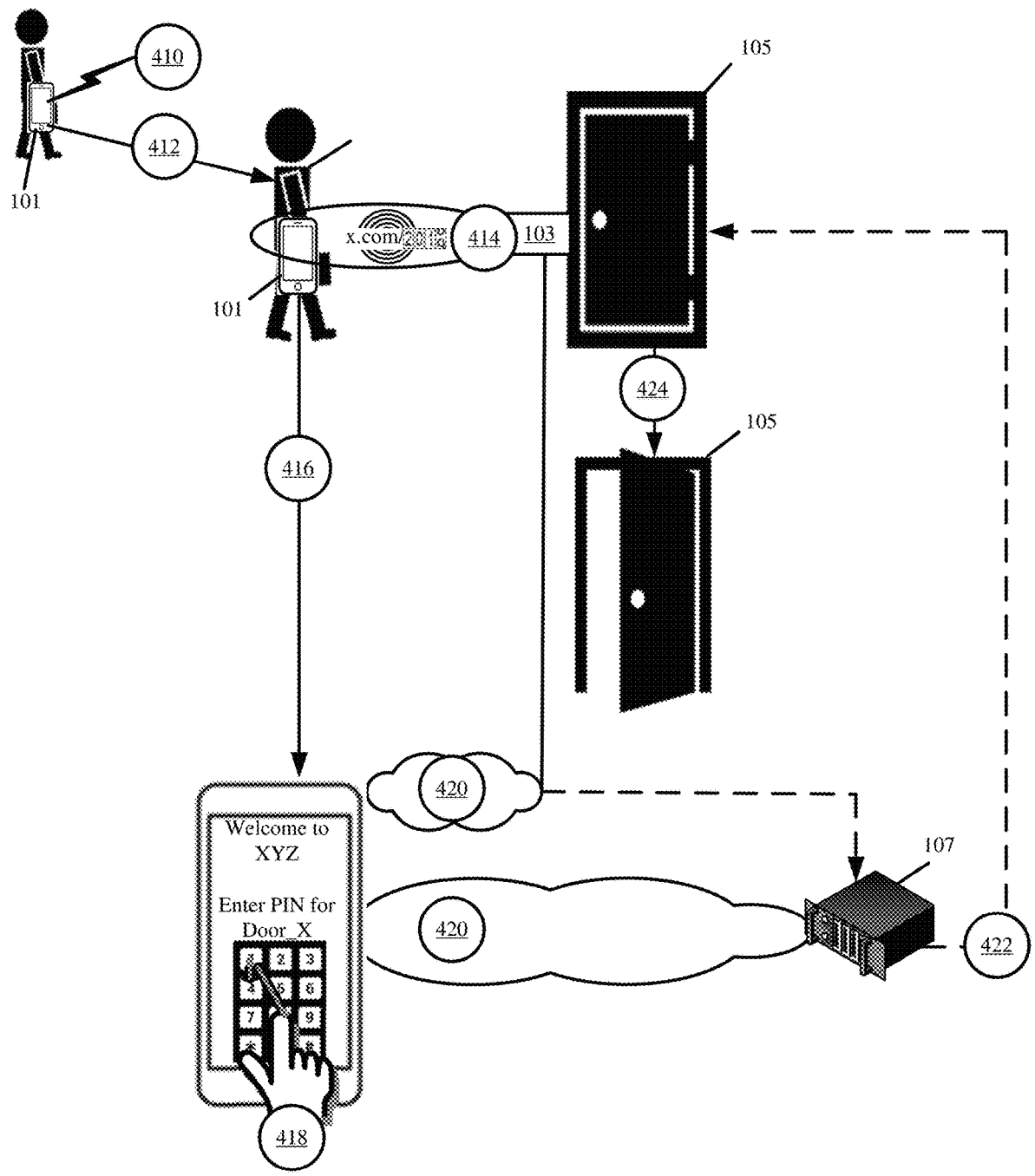
FIG. 4 illustrates an example of a contactless triggering action for transferring the access activation data and/or initiating the secure authorization via the dynamic interface in accordance with some embodiments presented herein.

FIG. 4 illustrates an example of a contactless triggering action for transferring the access activation data and/or initiating the secure authorization via the dynamic interface in accordance with some embodiments presented herein. In FIG. 4, resource access device 103 may support NFC for the above described triggering actions, and one or more other wireless network technologies, such as Bluetooth, Bluetooth Low Energy ("BLE"), WiFi, and UWB for performing an alternate or secondary triggering action that still requires UE proximity to resource access device 103.

Visitor UE 101 may receive (at 410) a visitor access code with which to gain access to secured resource 105 that is associated with resource access device 103. Resource access device 103 may not have a physical keypad, and may provide the contactless triggering action as the alternate or secondary triggering action for visitor UE 101 that may lack NFC functionality or for a user that is unaware of how to perform the NFC-based or contact-based triggering action.

The user may move (at 412) visitor UE 101 within wireless range of resource access device 103. The wireless range may extend a few feet from resource access device 103, and may correspond to a distance that Bluetooth, WiFi, or UWB signaling may extend from resource access device 103. When within wireless range, visitor UE 101 may receive (at 414) the access activation data in an alternative format of the wireless network technology used by resource access device 103 and visitor UE 101.

In some embodiments, the access activation data may be provided as a URIbeacon, other Bluetooth beacons, or other Bluetooth message or signaling. For instance, resource access device 103 may broadcast or advertise a changing access identifier for the valid instance of the dynamic interface in a URIbeacon or another Bluetooth beacon. The beacon can produce the same automated actions on visitor UE 101 as the ndef tag. In particular, the beacon may direct a browser or web application of visitor UE 101 to a specific access identifier without user interaction, without preconfiguring or preinstalling any specialized software on visitor UE 101, and/or without customizing visitor UE 101 in any manner for the keyless access system. Accordingly, when visitor UE 101 enters into Bluetooth range of resource access device 103, visitor UE 101 may wirelessly receive (at 414) the access activation data in the form of a Bluetooth beacon.

In response to receiving (at 414) the beacon, visitor UE 101 may automatically issue (at 416) a request for the dynamic interface at the access identifier, that is identified in the access activation data or received beacon, using a browser or web application. In some embodiments, the received beacon may create a notification on visitor UE 101, the user may select or interact with the notification, and, in response to the interaction with the notification, visitor UE 101 may automatically launch a browser and direct the browser to the access identifier from the access activation data or beacon. In some embodiments, the beacon may be registered to a specific application on visitor UE 101. Receipt of the beacon by visitor UE 101 may activate the specific application, and may cause the specific application to access the dynamic interface at the access identifier.

In some embodiments, the access activation data may be provided as a WiFi Service Set Identifier ("SSID"). For instance, resource access device 103 may broadcast or advertise an SSID that is commonly accessed, widely available, or one that visitor UE 101 may automatically connect to as a result of having previously connected to a WiFi network with the same SSID. Accordingly, when visitor UE 101 enters into WiFi range of resource access device 103, visitor UE 101 may wirelessly receive (at 414) the SSID. In response to receiving (at 414) the SSID and/or recognizing the SSID as a WiFi network that visitor UE 101 has previously connected to, visitor UE 101 may attempt to join the WiFi network created by resource access device 103. Resource access device 103 may provide (at 416) visitor UE 101 with a captive portal. The captive portal may cause visitor UE 101 to automatically direct a browser or web application to a specific URI. In this case, the specific URI may be the access identifier of the dynamic interface.

The user may enter (at 418) the received (at 410) visitor access code into the dynamic interface before expiration of the dynamic interface. Visitor UE 101 may transmit (at 420) the visitor access code over one or more wireless networks. For instance, when receiving (at 414) a URIbeacon, visitor UE 101 may establish a secure Bluetooth connection with resource access device 103, may provide (at 420) the visitor access code to resource access device 103 over the secure Bluetooth connection, and resource access device 103 may locally authorize access or may forward the visitor access code to access control unit 107 for authorization. Additionally, or alternatively, visitor UE 101 may provide (at 420) the visitor access code to access control unit 107 via one or more second networks. For instance, visitor UE 101 may connect to a WiFi network and/or a long-range wireless telecommunications network (e.g., a 4G LTE or 5G network), and may transmit (at 420) the visitor access code to access control unit 107 over the one or more second networks.

Access control unit 107 may determine if visitor UE 101 is authorized to access secured resource 105 based on the received visitor access code and/or the access identifier used by visitor UE 101 to access the dynamic interface. In response to successfully authorizing visitor UE 101 to access secured resource 105, access control unit 107 may issue (at 422) a command or signaling to secured resource 105. In response to the issued (at 422) command or signaling, secured resource 105 may provide (at 424) access or otherwise change state.

Resource access device 103 may use the different triggering actions and the different networks to expand the secure authorization to visitor UEs 101 that support at least one of the triggering actions and/or networks. Accordingly, a first UE, that has a Bluetooth radio turned off, may still perform the triggering action using the NFC tap-and-go operation, and a second UE, that does not have an NFC chip but that has an active Bluetooth radio, may perform the triggering action using the Bluetooth beacons.

Figure 5:
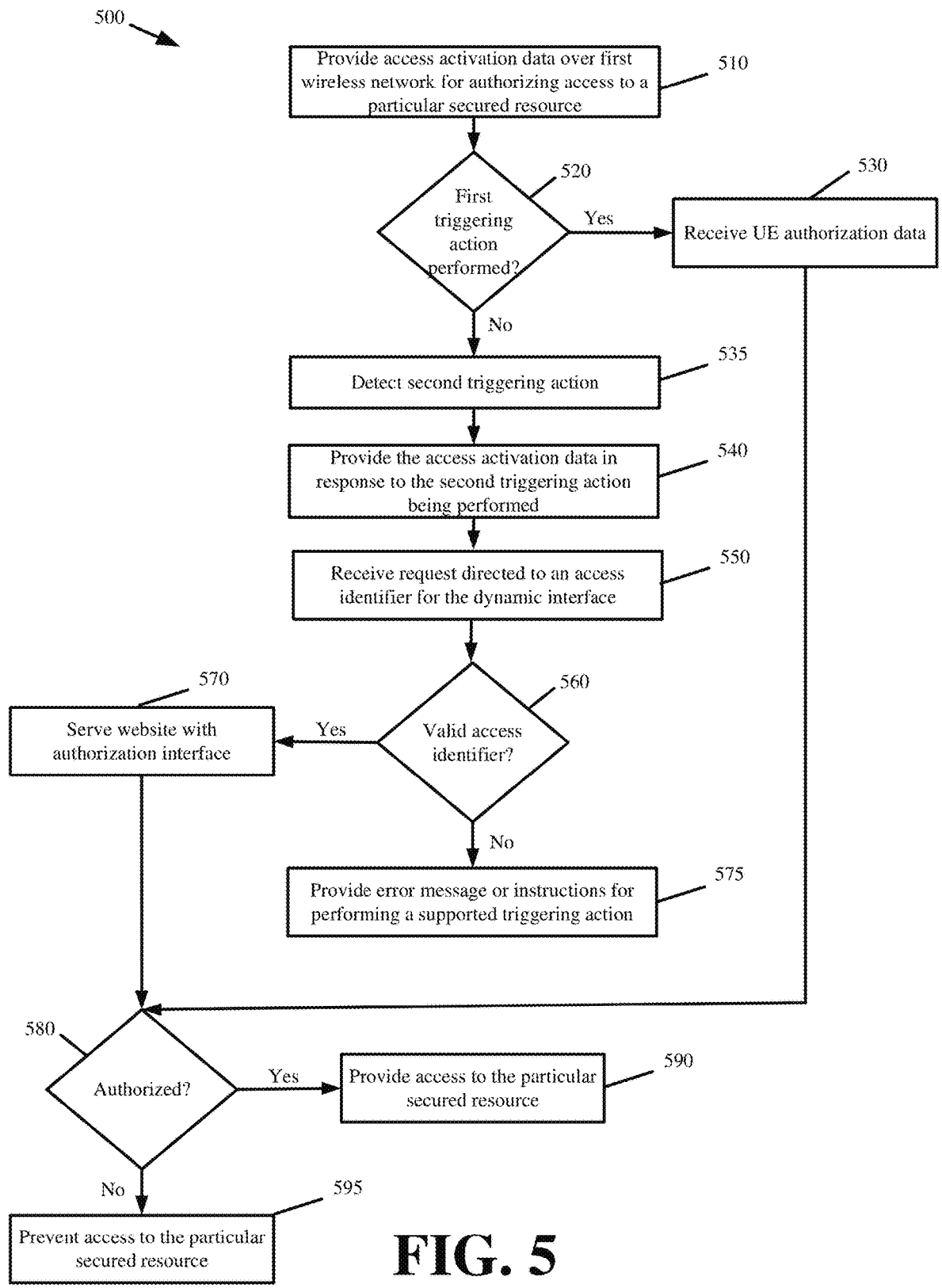
FIG. 5 presents a process for securely authorizing user access to a secured resource via a dynamic interface that is provided in response to different triggering actions in accordance with some embodiments presented herein.

FIG. 5 presents process 500 for securely authorizing user access to a secured resource via a dynamic interface that is provided in response to different triggering actions in accordance with some embodiments presented herein. Process 500 may be performed by components of the keyless access system include one or more of resource access device 103 and access control unit 107.

Process 500 may include providing (at 510) access activation data for a first triggering action over at least a first wireless network. The access activation data may be linked to a particular secured resource that is geographically closest to a location of resource access device 103 providing (at 510) the access activation data. Resource access device 103 may broadcast or advertise the access activation data over the first wireless network so that any visitor UE 101 in range of the first wireless network with a first wireless network radio may detect and/or receive the access activation data without having to connect to resource access device 103.

In some embodiments, the access activation data may include a beacon, captive portal signal, and/or other Bluetooth, WiFi, or UWB messaging. In particular, the beacon may be a URIbeacon or other beacon that includes a URI for the current valid instance of the dynamic interface, and that automatically causes a receiving visitor UE 101 to launch a browser and/or direct the browser to the URI without user involvement with the browser or any keyless access system customizations to visitor UE 101. The captive portal signal may be associated with an SSID or other WiFi signaling that can be used to direct a browser of visitor UE 101, that is actively scanning for available WiFi networks, to a captive portal that presents the valid instance of the dynamic interface without user involvement with the browser or any keyless access system customizations to visitor UE 101.

Process 500 may include determining (at 520) if the first triggering action is performed by visitor UE 101. The first triggering action may be performed when visitor UE 101 enters into wireless range of resource access device 103, has the first wireless network radio active and listening for signaling, receives the access activation data from resource access device 103, and accesses the valid instance of the dynamic interface based on the URI included with access activation data. Some visitor UEs 101 may be unable to perform the first triggering action because the first network wireless radio for receiving the broadcast access activation data and/or performing the first triggering action may be turned off, deactivated, or unsupported. Some visitor UEs 101 may have privacy settings that prevent the first triggering action from being performed, may not automatically connect to a WiFi network that provides the captive portal because the SSID is not recognized or because the visitor UE 101 does not automatically connect to that WiFi network, or may provide a notification for completing the first triggering action that the user may ignore or may not perform additional actions for completing the first triggering action (e.g., unlock the UE and select the notification to launch the dynamic interface).

In response to determining (at 520— Yes) that the first triggering action is performed, process 500 may include receiving (at 530) UE authorization data from visitor UE 101 via the dynamic interface over the first wireless network or a different second wireless network. In some embodiments, performing the first triggering action may include directing visitor UE 101 to the valid instance of the dynamic interface based on the access identifier within the access activation data, and receiving (at 530) a visitor access code or login credentials that are entered in the dynamic interface and submitted by visitor UE 101 to access control unit 107. In some embodiments, performing the first triggering action may include activating a specific application on visitor UE 101 that automatically provides the UE authorization data to the keyless access system. For instance, a beacon received by visitor UE 101 may be registered to a specific application of the keyless access system, the operating system of visitor UE 101 may automatically activate the specific application based on the received beacon, and the specific application may automatically provide (at 530) the UE authorization data. Process 500 may include authorizing (at 580) visitor UE 101 access to the particular secured resource based on the received UE authorization data.

In response to determining (at 520— No) that the first triggering action is not performed, process 500 may include detecting (at 535) a second triggering action. Detecting (at 535) the second triggering action may include detecting an NFC touch-and-go-operation, or detecting the press of a button on resource access device 103 when visitor UE 103 is placed in NFC or other short-range wireless range of resource access device 103. The second triggering action may also be performed by providing a dynamically changing QR code or another visual identifier that visitor UE 101 may scan.

Process 500 may include providing (at 540) the access activation data with a current access identifier for accessing a valid instance of the dynamic interface to visitor UE 101 in response to the second triggering action being performed by visitor UE 101. The current access identifier may be a URI that is included with an ndef tag or other NFC tag when NFC is used to provide (at 540) the access authorization data, wherein the ndef tag may cause visitor UE 101 to automatically launch a browser and/or direct the browser to the current access identifier without user involvement with the browser or any keyless access system customizations to visitor UE 101. Alternatively, the current access identifier may be encoded within a dynamically changing QR code or another visual identifier that causes visitor UE 101 to open a browser to the current access identifier upon scanning of the visual identifier. In some embodiments, an existing network connection, that is established using a network technology other than NFC, may be used to provide (at 540) the access activation data. In any case, resource access device 103 may transmit the current access identifier to visitor UE 101 via one or more data packets or wireless messages.

Process 500 may include receiving (at 550) a request directed to an access identifier for the dynamic interface over the first wireless network or at least a second wireless network. Process 500 may include determining (at 560) whether the received (at 550) access identifier is valid or invalid. A valid access identifier is one that is current and can be used to access a valid instance of the dynamic interface for authorizing access to the particular secured resource or another secured resource. An invalid access identifier is an access identifier that is not a current access identifier (e.g., a previously generated access identifier that has expired) or is an access identifier that references a non-existent or invalid secured resource.

In response to determining (at 560— Yes) that the received access identifier is valid for authorizing access to the particular secured resource, process 500 may include serving (at 570) the valid instance of the dynamic interface with one or more input fields by which a user may enter a valid access code or login credentials. In response to determining (at 560— No) that the received access identifier is invalid, process 500 may include providing (at 575) an error message or instructions for performing one of the supported triggering actions.

Process 500 may include authorizing (at 580) access to the particular secured resource based on UE authorization data provided by visitor UE 101 using the valid instance of the dynamic interface or based on UE authorization data that is provided by visitor UE 101 as a result of the first triggering action being performed. Successful authorization may be based on visitor UE 101 providing a valid access code that authorizes at least visitor UE 101 to access at least the particular secured resource. Unsuccessful authorization may include receiving an access code that authorizes a different UE access to the particular secured resource, that authorizes visitor UE 101 access to a secured resource other than the particular secured resource, or that does not authorize access to any secured resource. Successful authorization may also be based on valid login credentials provided by visitor UE 101. The valid login credentials may include a username and/or password provided by visitor UE 101 that uniquely identifies a particular entity that access control unit 107 may determine has access to the particular secured resource. The valid login credentials may include SSO credentials, in which a third-party service verifies the identity of the user, and access control unit 107 determines that the identified user is authorized access to the particular secured resource.

In some embodiments, access control unit 107 may be configured and/or may store a list of valid visitor access codes that different visitor UEs 101 can use to access different secured resources 105 at different times. Access control unit 107 may also have access to an active directory that identifies a set of authorized users and/or visitors that may access different secured resources 105 at different times, may identify the user requesting access based on login information provided via the dynamic interface or user identity information provided by a SSO third-party provider, and may determine if the identified user is authorized to access secured resource 105.

In response to successfully authorizing (at 580— Yes) access, process 500 may include providing (at 590) access to the particular secured resource. Providing (at 590) access may include access control unit 107 issuing messaging or signaling to change a state (e.g., open, unlock, rotate, lower, etc.) of the particular secured resource.

In response to unsuccessfully authorizing (at 580— No) access, process 500 may include preventing (at 595) access to the particular secured access. In this case, the state of the particular secured resource is not changed, and visitor UE 101 may retry authorization if usage of the valid instance of the dynamic interface remains within an expiration time.

In some embodiments, process 500 and/or the dynamic interface may be simplified by removing the need for user authorization with a valid access identifier. Instead, the dynamic interface may include a button or input with which a user may request access to a particular secured resource 105 for a specified amount of time without providing an access code.

Figure 6:
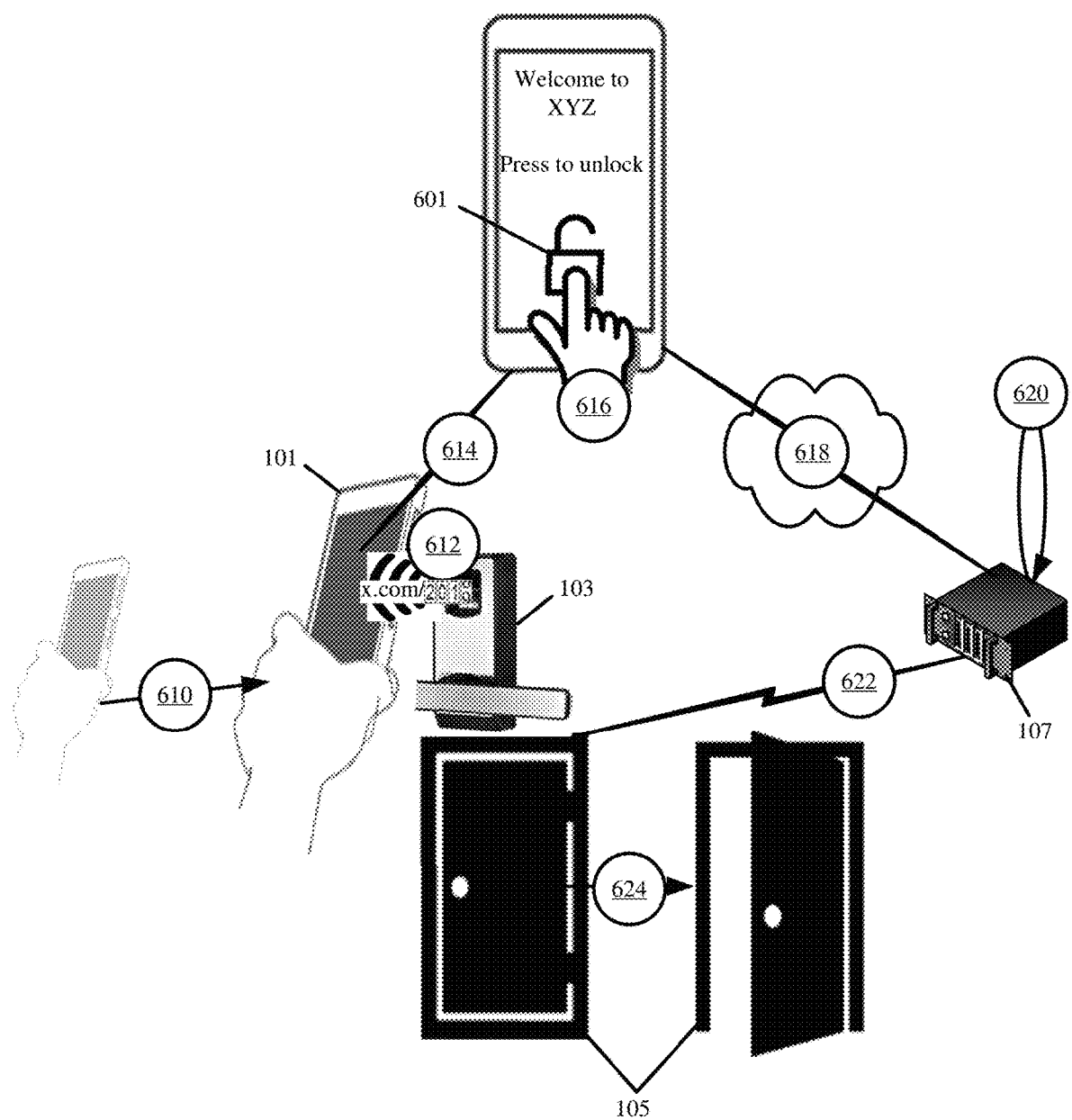
FIG. 6 illustrates an example of requesting access via a simplified dynamic interface in accordance with some embodiments presented herein.

FIG. 6 illustrates an example of requesting access via a simplified dynamic interface presented to UE 101 in accordance with some embodiments presented herein. As shown in FIG. 6, a user may perform (at 610) a triggering action by placing UE 101 next to or against resource access device 103.

In response to detecting the triggering action and/or initiating an NFC tap-and-go-operation or other short range detection of UE 101, resource access device 103 may provide (at 612) UE 101 with access activation data that includes the current access identifier (e.g., URI) for accessing a valid instance of the simplified dynamic interface, and/or that further includes instructions causing UE 101 to automatically access the valid instance of the simplified dynamic interface at the current access identifier via a browser or other application of UE 101 that is not provided by the keyless access system.

UE 101 may automatically access (at 614) the valid instance of the simplified dynamic interface in response to receiving (at 612) the access activation data. As shown in FIG. 6, the simplified dynamic interface may include virtual button 601 for requesting access to secured resource 105. The simplified dynamic interface, and more specifically, the current access identifier used to access the simplified dynamic interface may remain valid for a specified period of time (e.g., 5 seconds). After the specified period of time, the URI or current access identifier of the simplified dynamic interface for accessing secured resource 105 may be changed, and the simplified dynamic interface that is accessed prior to the access identifier changing may no longer be used to request and/or gain access to secured resource 105.

In response to a user pressing (at 616) the virtual button of the simplified dynamic interface presented on UE 101, UE 101 may send (at 618) a message to access control unit 107 using the access identifier that was used to access the simplified dynamic interface. Access control unit 107 may determine (at 620) that the message is issued from an instance of the simplified dynamic interface that was accessed using a particular access identifier, and may determine that the particular access identifier is still valid and/or has not changed (e.g., the message is issued using the particular access identifier within the specified period of time). Accordingly, access control unit 107 may provide (at 622) messaging or commands to grant (at 624) access to secured resource 105. If, however, the user presses the virtual button after the specified period of time, access control unit 107 may determine that the message from UE 101 is passed to an access identifier or URI that has expired or changed. In this case, access control unit 107 may deny access to secured resource 105.

In some embodiments, the simplified dynamic interface may serve to provide an alert in addition to or instead of granting access to secured resource 105. For instance, if the user presses the virtual button of the simplified dynamic interface, UE 101 may provide a message to access control unit 107 and/or other devices, and access control unit 107 and/or the other device may provide a visual alert (e.g., flash a light), an audible alert (e.g., ring a doorbell), or other notification in response to verifying that the message was issued to a URI is valid, has not expired, and/or has not changed.

In some embodiments, access control unit 107 may receive the message from UE 101 in response to the virtual button press occurring within the specified period of time, and access control unit 107 may send notifications to UEs of a receptionist and/or other employees in a building to alert the receptionist and/or the other employees as to the presence of a visitor near access device 103 or secured resource 105. Additionally, or alternatively, access control unit 107 may include or may trigger a doorbell, chime, or other visual or audible alert so that the receptionist and/or other employees are made aware of the visitor's presence. Access to secured resource 105 may then be provided manually by someone inside the building opening or accessing secured resource 105 to let the visitor through. Alternatively, the receptionist and/or other employees may receive the notification from access control unit 107 on their UEs 101, and may reply with a wireless message that instructs access control unit 107 to grant access.

Figure 7:
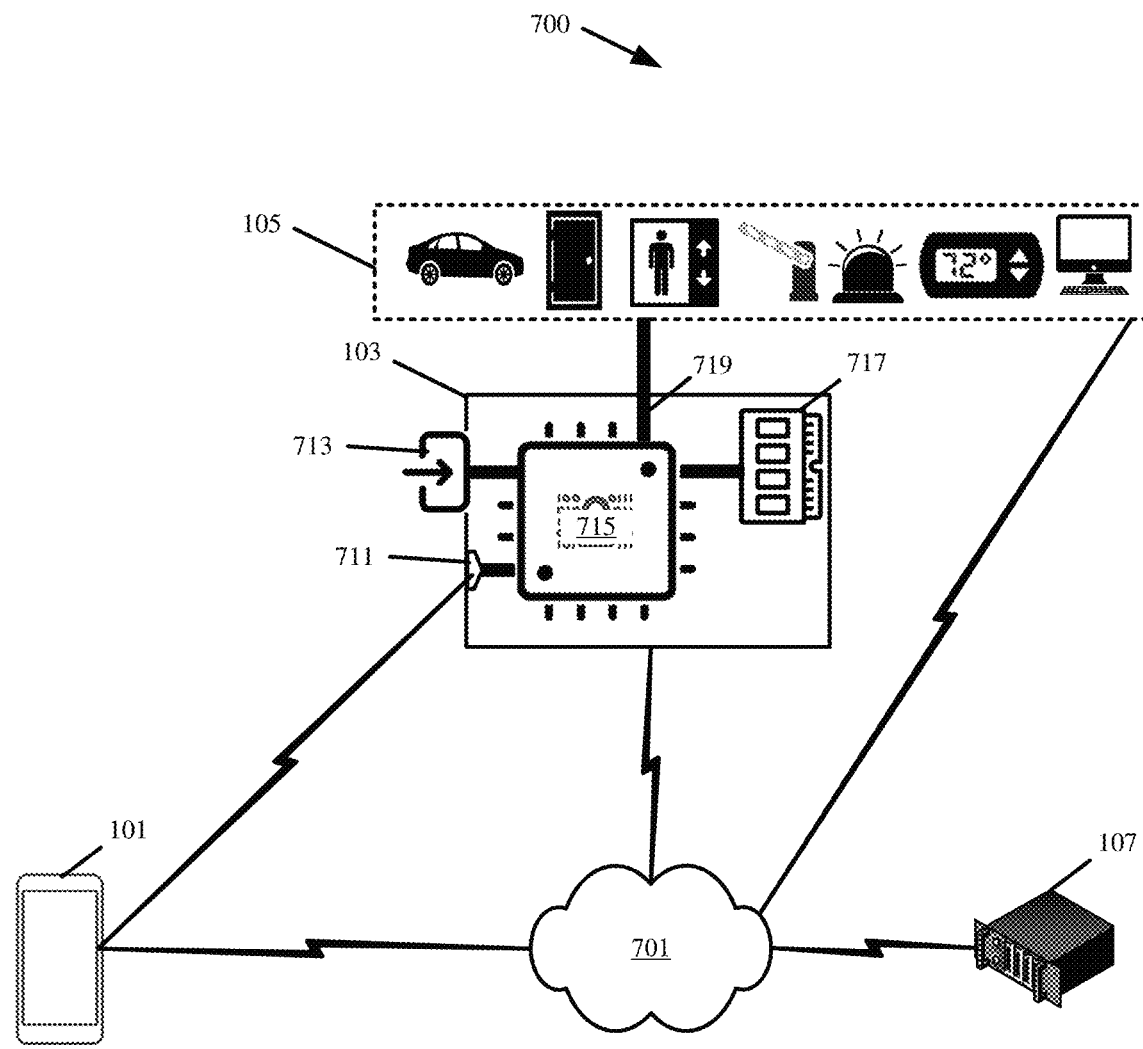
FIG. 7 illustrates an example environment for the keyless access system that securely authorizes user access to a secured resource via the dynamic interface that is provided to a visitor UE upon detection of a triggering action in accordance with some embodiments.

FIG. 7 illustrates example environment 700 for the keyless access system that securely authorizes user access to a secured resource via the dynamic interface that is provided to visitor UE 101 upon detection of a triggering action in accordance with some embodiments. Environment 700 may include visitor UE 101, one or more resource access devices 103, secured resources 105, access control unit 107, and one or more networks 701.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc.

In some embodiments, one or more of the devices of environment 700 may perform one or more functions described as being performed by another one or more of the devices of environment 700. For example, functionality of access control unit 107 and access device 103 may be combined and performed from a single device, and/or a single resource access device 103 may be associated with and/or used to facilitate access to one or more secured resources 105. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

Visitor UE 101 may include a portable computing and communication device, such as a personal digital assistant ("PDA"), a "smart" phone, a cellular phone, a laptop computer, a tablet computer, etc. Visitor UE 101 may, in some embodiments, include a computing and communication device that may be worn by a user (also referred to as "wearable" devices) or otherwise carried on the user such as a watch, a fitness band, a necklace, glasses, a ring, a belt, a headset, an Internet-of-Things ("IoT") device, a sensor, and/or another type of wearable device. In any case, visitor UE 101 may include one or more wireless radios, and a browser or other web application that can access websites, HyperText Markup Language ("HTML") pages, or other Internet content. The browser may include an application that is installed by or customized for the keyless access system. More generally, visitor UE 101 may include a device that is not installed with and that does not run any specialized or customized software of the keyless access system. The one or more wireless radios may include an NFC, Bluetooth, WiFi, Third Generation ("3G"), Fourth Generation ("4G") or Long-Term Evolution ("LTE"), and/or Fifth Generation ("5G") Next Radio ("NR") radio.

Each resource access device 103 may be associated with one or more secured resources 105, and may facilitate visitor access to associated secured resources 105. In particular, each resource access device 103 may provide the access activation data with the changing access identifier that causes visitor UE 101 to automatically access a dynamic interface for authorized access to an associated secured resource 105 via the browser of visitor UE 101 without user interaction with the browser or specialized keyless access system code running on visitor UE 101.

Resource access devices 103 may be distributed across one or more locations and/or sites, and may be located within a specified distance (e.g., a few feet) of one or more associated secured resources 105. Resource access devices 103 may correspond to wireless readers of the keyless access system that may include one or more radios 711, sensors 713, processors 715, memory and/or storage 717, and/or resource interface 719. The readers may provide authorized users keyless access to associated secured resources 105 upon reading valid security credentials from keycards, wireless fobs, and/or specialized keyless access system applications that execute on the UEs.

Radios 711 may include may include an NFC, Bluetooth, WiFi, 3G, 4G or LTE, 5G NR, UWB, and/or other radios. Radios 711 may be used to communicate with visitor UE 101, UEs of authorized users, and/or wireless access devices such as a keyless fob, proximity card, or smartcard. UEs of authorized users may execute a specific application that activates upon entering range of the one or more radios 711, and that transmits preconfigured security credentials or tokens of the authorized user to resource access device 103.

Radios 711 may also be used to wirelessly advertise or broadcast the access activation data over one or more supported wireless network and/or to provide the access activation data in response to detecting a triggering action that is performed by visitor UE 101. For instance, an NFC chip may be used to distribute the access activation data via an ndef tag, a Bluetooth radio may be used to distribute the access activation data as a Bluetooth beacon, a WiFi radio or LTE radio may be used to distribute the access activation data as an HTTP message.

In some embodiments, radios 711 may also be used to perform and/or detect the triggering action. For example, NFC tap-and-go-operation may be used as the triggering action. As another example, radios 711 may detect visitor UE 101 signal strength, operating frequencies, and/or other characteristics, and may perform and/or detect the triggering action in response to the signal strength, operating frequencies, and/or other characteristics satisfying one or more thresholds. Bluetooth beacons, a WiFi captive portal, and/or messaging or signaling of other networks may also be used to perform and/or detect the triggering action.

Sensors 713 may also be used to perform and/or detect the triggering action. Sensors 713 may include a button, touch sensor, depth sensor, magnetometer, microphone, camera, infrared sensor, thermometer, radar, LiDAR, sonar, and/or other sensory modules. For instance, a user touch or spoken phrase may be detected by sensor 713 as a triggering action, and resource access device 103 may provide the access activation data via one or more radios 711 in response to detecting the triggering action with sensor 713.

Processors 715 may be used to implement the rolling code generator that creates the changing access identifiers for accessing the valid instance of the dynamic interface and/or visual identifiers (e.g., QR codes) that convey the changing access identifiers. In some embodiments, processors 715 may be also be used to authorize user access to associated secured resources 105 when the dynamic interface is provided from resource access device 103 and/or the access code or login credentials entered in the dynamic interface are provided to resource access device 103 for authorization.

Memory and/or storage 717 may store the code for the rolling code generator, the seed value, and/or other data from which processors 715 may generate the dynamically changing access identifiers. Memory and/or storage 717 may also store the criteria that restricts use of certain access codes and/or login credentials to certain UEs.

Resource interface 719 may include a wired or wired interface to associated secured resources 105 whose state resource access device 103 may directly control. In some embodiments, may provide unlock, lock, open, close, and/or other state change signaling to a particular associated secured resource 105 in order to cause the corresponding state change at the particular associated secured resource 105.

Secured resources 105 may include any physical or logical device or system with restricted or configurable access. Secured resources 105 may include or operate in at least one of two states that can be remotely changed by access control unit 107 and/or an associated resource access device 103.

Secured resources 105 may include vehicles, points of entry (e.g., doors, gates, turnstiles, elevators, and/or other physical barriers), security systems, computer systems, climate control systems, and/or other remote keyless systems and devices. The different controllable states of a vehicle may include locking and unlocking doors, turning on and off the engine, stopping or moving the vehicle, etc. Similarly, the different controllable states of a point of entry may include opening or closing access, alerting devices or persons as to the presence of a user, changing indicator lights, locking or unlocking a locking mechanism of the point of entry, etc.

Access control unit 107 may be a centralized controller for the keyless access system. Access control unit 107 may configure resource access devices 103, control access to secured resources 105, and perform the secure authorization of UEs. Access control unit 107 may execute the same rolling code generator as resource access devices 103 using one or more processors. The rolling code generator may be configured with the same seed values that are used by each resource access device 103 so that access control unit 107 may synchronously generate the same access identifiers that are generated by resource access devices 103 at different times. Access control unit 107 may operate as web server, and may periodically update the URIs for accessing valid instances of the dynamic interface that can be used to authorize visitor access to different secured resources 105 based on the changing access identifiers. Specifically, the dynamic interface for authorizing access to each secured resource 105 may be accessed using a different URI, and access control unit 107 may periodically change that URI while keeping the URI synchronized with the URIs that are provided in the access authorization data from the resource access device 103 that is associated with that secured resource 105.

Access control unit 107 may store valid user credentials and valid visitor codes so that authorization requests from visitor UE 101 and/or UEs of authorized users can be authorized at access control unit 107. Access control unit 107 may also store access restrictions that limit which secured resources 105 a UE may receive access to based on which user credentials and/or visitor codes are provided.

Access control unit 107 may include an on-premises authorization device or an off-premises authorization device of the keyless access system. Accordingly, access control unit 107 may execute from one or more dedicated devices or may execute from hosted resources of a cloud-service provider.

Access control unit 107 may have a network interface to communicate with UEs 101 and/or components of the keyless access system via one or more networks 701. Access control unit 107 may also control state of secured resources 105 via commands or signaling that is issued over one or more networks 701.

Networks 701 may include one or more of Bluetooth, WiFi, 3G, 4G or LTE, 5G, and/or UWB that can be used to provide the access activation data, provide access to the dynamic interface, and/or provide the commands or signaling for controlling access to secured resources 105. Accordingly, networks 701 may interconnect and/or facilitate network communications between visitor UE 101, resource access devices 103, secured resources 105, and access control unit 107.

Figure 8:
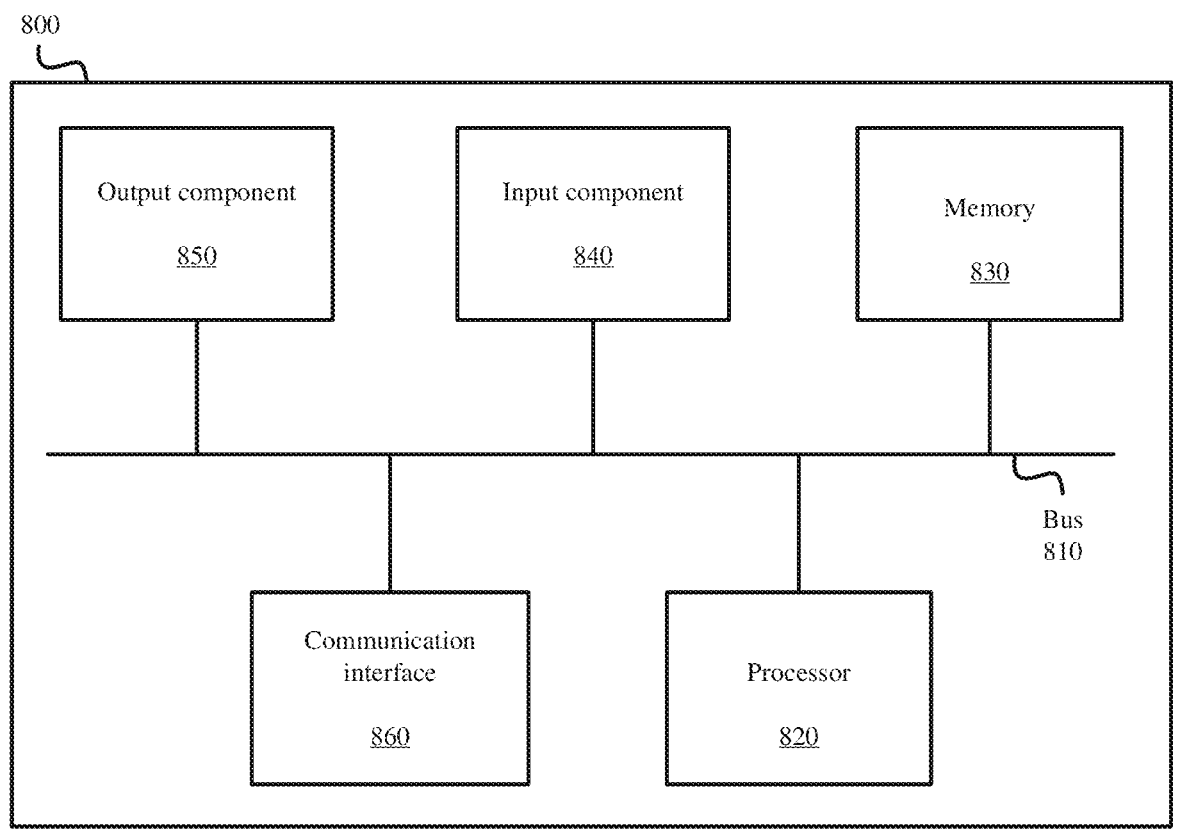
FIG. 8 illustrates example components of one or more devices, according to one or more embodiments described herein.

FIG. 8 is a diagram of example components of device 800. Device 800 may be used to implement one or more of the devices or systems described above (e.g., visitor UE 101, resource access devices 103, secured resources 105, access control unit 107, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   modifying, on a periodic basis, an access identifier that is used to access a dynamic interface for authorizing visitor access to a particular secured resource;
   providing access activation data to a user equipment ("UE") in response to a triggering action that confirms the UE to be within a specified distance from the particular secured resource, wherein the access activation data comprises a first access identifier that is a current access identifier generated from said modifying, and wherein the access activation data causes the UE to automatically direct a browser to the first access identifier;
   providing the dynamic interface to the UE in response to the access activation data automatically directing the browser of the UE to the first access identifier, the dynamic interface presenting at least one of a keypad or a login screen;
   receiving, from the UE, UE authorization data that is entered using the keypad or the login screen of the dynamic interface; and
   providing access to the particular secured resource based on the first access identifier used in accessing the dynamic interface being associated with the particular secured resource, the UE authorization data authorizing access to the particular secured resource, and the access being provided before an expiration time.

2. The method of claim 1 further comprising:
   preventing access to the particular secured resource in response to receiving the UE authorization data from the UE after the expiration time.

3. The method of claim 2 further comprising:
   receiving a request for the dynamic interface from the UE after providing the access activation data;
   starting a timer upon providing the dynamic interface to the UE; and
   wherein providing the dynamic interface based on the access being provided before the expiration time comprises determining that the UE accesses the dynamic interface using the first access identifier before the expiration time in response to receiving the UE authorization data before the timer reaches a specific value; and
   wherein preventing access comprises determining that the UE accesses the dynamic interface using the first access identifier after the expiration time in response to receiving the UE authorization data after the timer reaches or exceeds the specific value; value.

4. The method of claim 1 further comprising:
   preventing access to the particular secured resource in response to the UE accessing the dynamic interface using the first access identifier after the expiration time.

5. The method of claim 4 further comprising:
   starting a timer upon providing the access activation data to the UE;
   receiving a request for the dynamic interface from the UE after providing the access activation data; and
   wherein providing the dynamic interface based on the access being provided before the expiration time comprises determining that the timer does not reach or exceed a particular value upon receiving the request; and
   wherein preventing access comprises determining that the timer reaches or exceeds the particular value upon receiving the request.

6. The method of claim 1 further comprising:
receiving a request for the dynamic interface at a second access identifier that is different than the first access identifier; and
preventing access to the particular secured resource based on the second access identifier used in accessing the dynamic interface being associated with a different secured resource than the particular secured resource.

7. The method of claim 1 further comprising:
preventing access to the particular secured resource based on the UE authorization data authorizing access to a different secured resource than the particular secured resource, or the UE authorization data corresponding to an invalid visitor code or unauthorized user.

8. The method of claim 1 further comprising:
detecting, at a resource access device that is adjacent to the particular secured resource, a Near Field Communication ("NFC") tap-and-go-operation performed by the UE as the triggering action, and
wherein the access activation data corresponds to an NFC Data Exchange Format ("ndef") tag that automatically directs the browser of the UE to the first access identifier.

9. The method of claim 1,
wherein the triggering action corresponds to the UE entering in range of Bluetooth signaling from a resource access device that is next the particular secured resource; and
wherein providing the access activation data comprises distributing a Bluetooth beacon with the first access identifier from the resource access device, wherein the UE is configured to automatically direct the browser to the first access identifier upon receiving the Bluetooth beacon.

10. The method of claim 1 further comprising:
wherein the triggering action corresponds to the UE entering in range of a WiFi or Ultra-wideband ("UWB") network created by a resource access device that is next the particular secured resource; and
wherein providing the access activation data comprises providing a captive portal that directs the browser of the UE to the first access identifier upon entering in range of the WiFi or UWB network.

11. The method of claim 1, wherein modifying the access identifier comprises:
generating a different Uniform Resource Identifier ("URI") to access the dynamic interface for authorizing visitor access to the particular secured resource after a particular amount of time,
wherein each URI comprises a static first portion and a changing second portion, and
wherein one of the static first portion and the changing second portion identifies the particular secured resource from a plurality of secured resources.

12. The method of claim 1 further comprising:
invaliding the dynamic interface that is accessed using the first access identifier after modifying the access identifier from the first access identifier to a second access identifier, wherein invalidating the dynamic interface comprises removing the keypad or the login screen from the dynamic interface; and
providing the dynamic interface with the keypad or the login screen for authorizing visitor access to the particular secured resource in response to a request that is directed to the second access identifier after modifying the access identifier to the second access identifier.

13. The method of claim 1 further comprising:
configuring an access code for accessing the particular secured resource;
distributing the access code to the UE; and
wherein providing access comprises:
granting access to the particular secured resource in response to the UE authorization data specifying the access code; and
preventing access to the particular secured resource in response to the UE authorization data specifying a code that is different than the access code.

14. The method of claim 1 further comprising:
configuring a set of users with access to the particular secured resource;
determining a user identity based on login information that is provided as the UE authorization data via the login screen; and
wherein providing access comprises:
granting access to the particular secured resource in response to the user identity corresponding to one of the set of users with access to the particular secured resource; and
preventing access to the particular secured resource in response to the user identity not corresponding to one of the set or users with access to the particular secured resource.

15. The method of claim 1 further comprising:
configuring an expiration value for the UE authorization data;
wherein providing access comprises:
granting access to the particular secured resource in response to receiving the UE authorization data before the expiration value;
preventing access to the particular secured resource in response to receiving the UE authorization data after the expiration value.

16. The method of claim 1 further comprising:
configuring a first UE signature that is permitted to use the UE authorization data to access the particular secured resource;
wherein providing access comprises:
granting access to the particular secured resource in response to the UE having the first UE signature;
preventing access to the particular secured resource in response to the UE having a different second UE signature.

17. A system comprising:
a resource access device that is located next to a particular secured resource, the resource access device comprising one or more processors configured to:
modify, on a periodic basis, an access identifier that is used to access a dynamic interface for authorizing visitor access to the particular secured resource;
provide access activation data to a user equipment ("UE") in response to a triggering action that confirms the UE to be within a specified distance from the particular secured resource, wherein the access activation data comprises a first access identifier that is a current access identifier generated from said modifying, and wherein the access activation data causes the UE to automatically direct a browser to the first access identifier;
an access control unit comprising one or more processors configured to:
synchronize modification of the access identifier with the resource access device;

provide the dynamic interface to the UE in response to the access activation data automatically directing the browser of the UE to the first access identifier, the dynamic interface presenting at least one of a keypad or a login screen;

receive, from the UE, UE authorization data that is entered using the keypad or the login screen of the dynamic interface; and provide access to the particular secured resource based on the first access identifier used in accessing the dynamic interface being associated with the particular secured resource, the UE authorization data authorizing access to the particular secured resource, and the access being provided before an expiration time.

18. The system of claim 17, wherein the one or more processors of the resource access device are further configured to:

detect a Near Field Communication ("NFC") tap-and-go operation involving the UE as the triggering action, and wherein the access activation data corresponds to an NFC Data Exchange Format ("ndef") tag that automatically directs the browser of the UE to the first access identifier.

19. The system of claim 17, wherein the one or more processors of the resource access device are configured to provide the access activation data by:

distributing a Bluetooth beacon to the UE when the UE is in range of Bluetooth signaling from the resource access device, and wherein the UE is configured to automatically direct the browser to the first access identifier upon receiving the Bluetooth beacon.

20. A non-transitory computer-readable medium, storing a plurality of processor-executable instructions to:

modify, on a periodic basis, an access identifier that is used to access a dynamic interface for authorizing visitor access to a particular secured resource;

provide access activation data to a user equipment ("UE") in response to a triggering action that confirms the UE to be within a specified distance from the particular secured resource, wherein the access activation data comprises a first access identifier that is a current access identifier generated from said modifying, and wherein the access activation data causes the UE to automatically direct a browser to the first access identifier;

provide the dynamic interface to the UE in response to the access activation data automatically directing the browser of the UE to the first access identifier, the dynamic interface presenting at least one of a keypad or a login screen;

receive, from the UE, UE authorization data that is entered using the keypad or the login screen of the dynamic interface; and provide access to the particular secured resource based on the first access identifier used in accessing the dynamic interface being associated with the particular secured resource, the UE authorization data authorizing access to the particular secured resource, and the access being provided before an expiration time.

* * * * *